A. M. PETERSON.
DOUGHNUT AND COOKY CUTTER.
APPLICATION FILED MAY 28, 1919.
1,322,942. Patented Nov. 25, 1919.
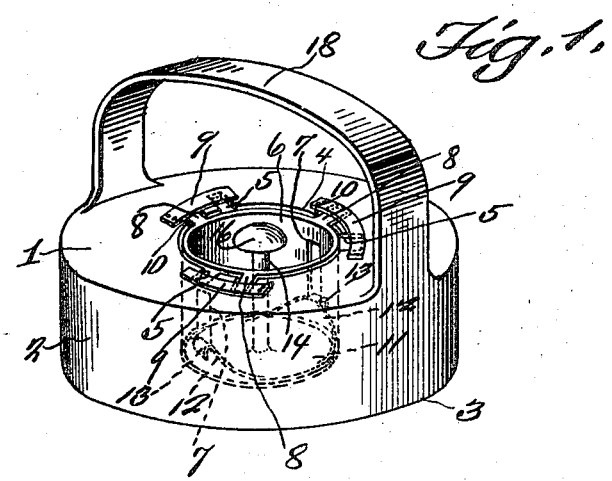
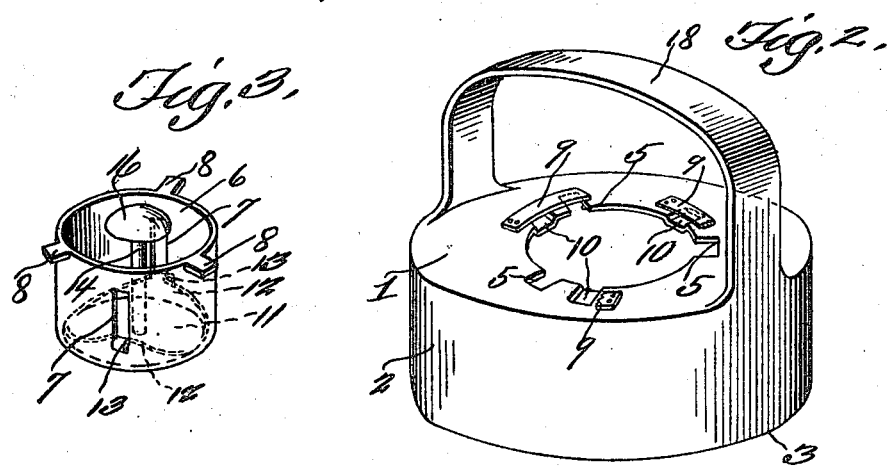
Witnesses
Inventor
A. M. Peterson,
By D. Swift & Co,
Attorneys

UNITED STATES PATENT OFFICE.

ALTA M. PETERSON, OF OCEAN PARK, WASHINGTON.

DOUGHNUT AND COOKY CUTTER.

1,322,942.   Specification of Letters Patent.   Patented Nov. 25, 1919.

Application filed May 28, 1919. Serial No. 300,282.

*To all whom it may concern:*

Be it known that I, ALTA M. PETERSON, a citizen of the United States, residing at Ocean Park, in the county of Pacific, State of Washington, have invented a new and useful Doughnut and Cooky Cutter; and I do hereby declare the following to be a full, clear, and exact description of the invention, such as will enable others skilled in the art to which it appertains to make and use the same.

This invention relates to the art of cooking utensils, and more particularly to an improved doughnut and cooky cutter, and one of the objects of the invention is to provide a combined device of this kind whereby an inner member of the device and the cleaner may be removed, thereby leaving a member which may be used for cutting cookies.

A further object of the invention is to provide a device, which, when all the parts are assembled, doughnuts may be cut.

A further object of the invention is to provide means for cleaning the dough from the inner portion of the cutter.

A further object of the invention is to provide a device of this kind having improved features of construction.

One of said improved and practical features of construction is to provide a device of this kind consisting of two sections, one of which is circular and provided with an annular flange for cutting the outer portion of the doughnut or cooky, and provided with a central opening to receive a cylindrical band, for cutting or forming the hole in the doughnut, there being means for detachably connecting the cylindrical band in said central opening.

A further object of the invention is the provision of a device for cleaning or removing the dough from the interior of the cylindrical band, said cleaning device having lug and slot connections at diametrically opposite points with said band, whereby the cleaner may be raised and lowered.

In practical fields the details of construction may necessitate alterations falling within the scope of what is claimed.

The invention comprises further features and combination of parts, as hereinafter set forth, shown in the drawings and claimed.

In the drawings:—

Figure 1 is a view in perspective of the improved doughnut and cooky cutter constructed in accordance with the invention.

Fig. 2 is a detail perspective view of the outer circular member, which may be used for cutting cookies.

Fig. 3 is a detail perspective view of the circular band, whereby the hole in the doughnut may be cut.

Fig. 4 is a detail perspective view of the plunger for cleaning or removing the dough from the circular band.

Referring more especially to the drawings, 1 designates the outer circular member of the device, which member is provided with an annular flange 2, the cutting edge 3 of which cuts the circular portion of the doughnut or cooky or the like. This member 1 has a central circular opening 4, which is concentric with the circular contour of said member. The upper wall of the member 1 adjacent the opening 4 is provided with a plurality of openings or slots 5, and 6 denotes a circular band, which is provided with diametrically opposite vertical slots 7, and with a plurality of lugs 8, which extend laterally from the upper edge of the circular band. When the band is inserted in place, the lugs 8 pass through the openings 5, after which a partial turn is imparted to the circular band, thereby causing said lugs to ride under the spring clasps or members 9, and engage the depressions 10, one being adjacent each slot or opening 5. By so securing the circular band, rotary and vertical movement of the band is prevented, in which case the band will cut through the dough, to make the hole in the doughnut. A suitable plunger 11 is provided for cleaning or removing the dough from the band. This plunger comprises a circular disk which is provided with diametrically oppositely disposed flanges 12, from which lateral lugs 13 extend, to engage the diametrically oppositely disposed slots 7, to prevent rotary movement of the plunger, and guide the plunger in its vertical movement. Rising upwardly from the center of the plunger 11 is a tubular stem 14, in which the shank 15 (shown in dotted lines in Fig. 4) of the knob 16 is secured by a pin 17, whereby the plunger may be moved upwardly and downwardly in the circular band, to remove the dough therein. Rising upwardly from the member 1 is a handle 18, whereby the combined doughnut and cooky cutter may be depressed into the dough. By removing the circular band, by imparting a partial turn to the same, the member 1 may be used for cutting cookies or cakes or the like.

The invention having been set forth what is claimed as new and useful is:—

1. A combined doughnut and cake cutter comprising a circular member having an annular cutting flange and provided with a circular opening having slots or openings adjoining thereto, said circular member having depressions adjoining the circular opening, leaf springs overlying said depressions and said slots, and a circular band passing on its upper edge laterally extending lugs to pass through said slots and ride under said springs and engage said depressions to hold the circular band in place.

2. A combined doughnut and cake cutter comprising a circular member having an annular cutting flange and provided with a circular opening having slots or openings adjoining thereto, said circular member having a depression adjoining the circular opening, a circular band having on its upper edge laterally extending lugs to pass through the slots and engage said depressions, by imparting a partial turn to the band, and means secured to the circular member and overlying the depressions and the slots to retain said lugs in said depressions.

3. A combined doughnut and cake cutter comprising a circular member having an annular cutting flange and provided with a circular opening having slots or openings adjoining thereto, said circular member having depressions adjoining the circular opening, a circular band having on its upper edge laterally extending lugs to pass through the slots and engage said depressions, by imparting a partial turn to the band, and means secured to the circular member and overlying the depressions and the slots to retain said lugs in said depressions, said circular band having diametrically oppositely disposed vertical slots, and a plunger mounted in said circular band and provided with lateral lugs extending through said vertical slots to prevent rotation of the plunger and allow vertical movement thereof.

In testimony whereof I have signed my name to this specification in the presence of two subscribing witnesses.

ALTA M. PETERSON.

Witnesses:
J. A. MOREHEAD,
BESSIE MOREHEAD.